United States Patent [19]

Gregg

[11] 3,832,998

[45] Sept. 3, 1974

[54] INTRAVENOUS FEEDING APPARATUS

[76] Inventor: David Paul Gregg, P.O. Address Calle Iturbo, 12, Madrid, Spain

[22] Filed: Jan. 30, 1973

[21] Appl. No.: 328,052

[52] U.S. Cl............. 128/214 E, 73/194 R, 73/228, 128/DIG. 13
[51] Int. Cl............................................. A61m 5/16
[58] Field of Search......... 128/214 R, 214 E, 214 F, 128/214.2, 227, DIG. 12, DIG. 13; 200/81.9 M; 73/194 R, 194 E, 228

[56] References Cited
UNITED STATES PATENTS

| | | | |
|---|---|---|---|
| 2,600,309 | 6/1952 | MacDonald et al. | 200/81.9 M |
| 3,163,176 | 12/1964 | Darling | 137/487.5 |
| 3,384,080 | 5/1968 | Muller | 128/214 F |
| 3,425,415 | 2/1969 | Gordon et al. | 128/214 E |
| 3,450,153 | 6/1969 | Hildebrandt et al. | 128/214 E |
| 3,729,777 | 6/1973 | Gregg | 128/214 E |

Primary Examiner—Dalton L. Truluck
Attorney, Agent, or Firm—Jessup & Beecher; Keith D. Beecher

[57] ABSTRACT

Improved intravenous feeding apparatus, and the like, is provided for controlling the drip flow of an intravenous solution into the patient's vein so that a pre-set drip rate may be maintained. The embodiment of the invention to be described includes an internal mechanical differentiating means which compares the actual drip rate of the solution through a receptacle with a pre-set drip rate, and which responds to any deviation of the actual drip rate from the pre-set drip rate to correct the flow of the solution so that the actual drip rate is maintained in correspondence with the pre-set drip rate at all times. The actual drip rate is detected by mounting a vane and magnetic member inside a receptacle through which the solution is dripped, the vane responding to each drip to turn itself and the magnetic member reciprocally about an axis. An external magnetic member responds to movements of the internal magnetic member to control a first mechanism which is coupled to the differentiating means. A metronome type of timer, which is set in correspondence with the pre-set drip rate is also coupled to the differentiating means, so that the differentiating means may compare the actual drip rate with the pre-set drip rate. Any departure of the actual drip rate from the pre-set drip rate causes the differential means to change the flow of the solution through the receptacle so as to compensate for the departure.

10 Claims, 9 Drawing Figures

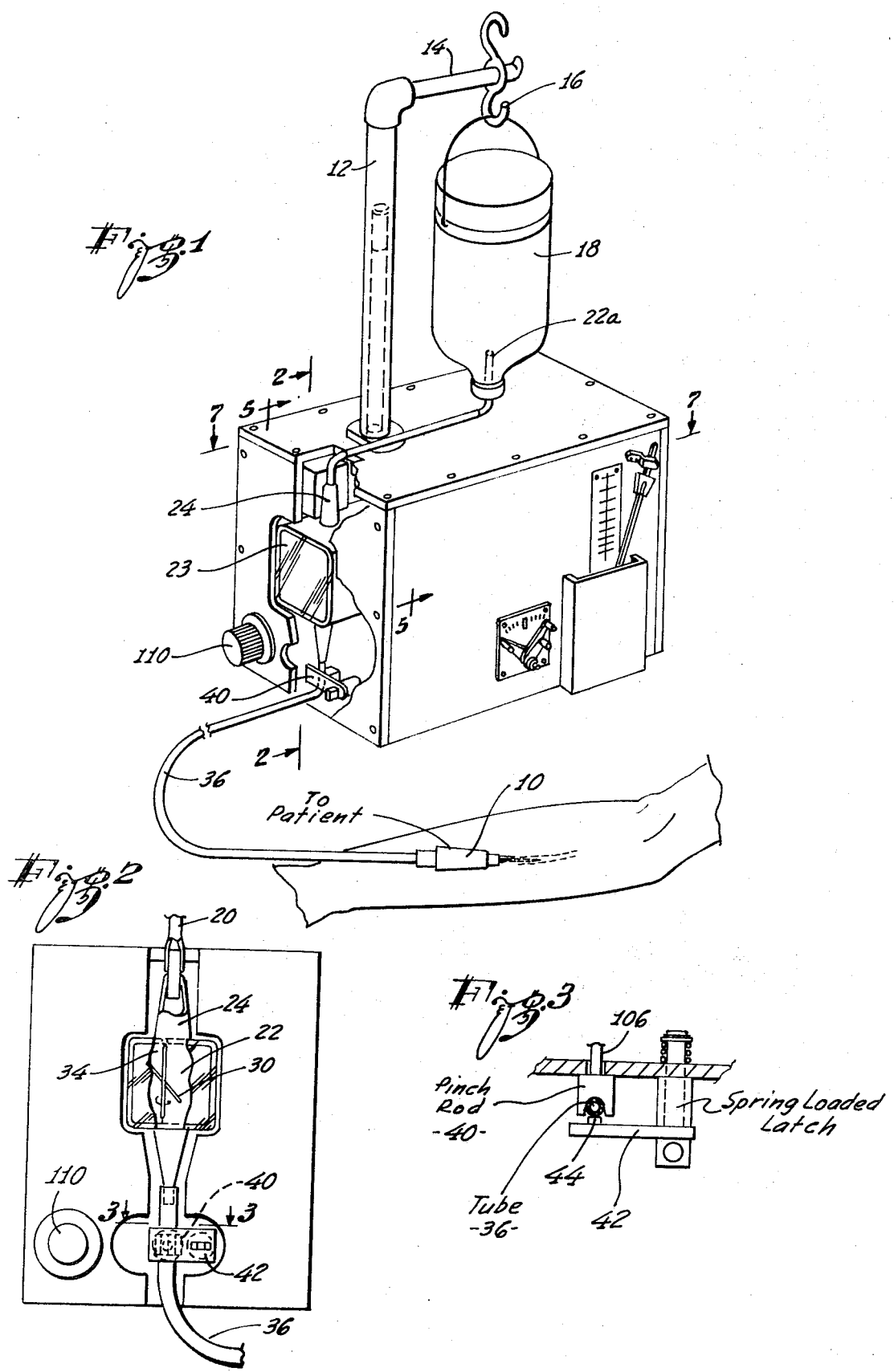

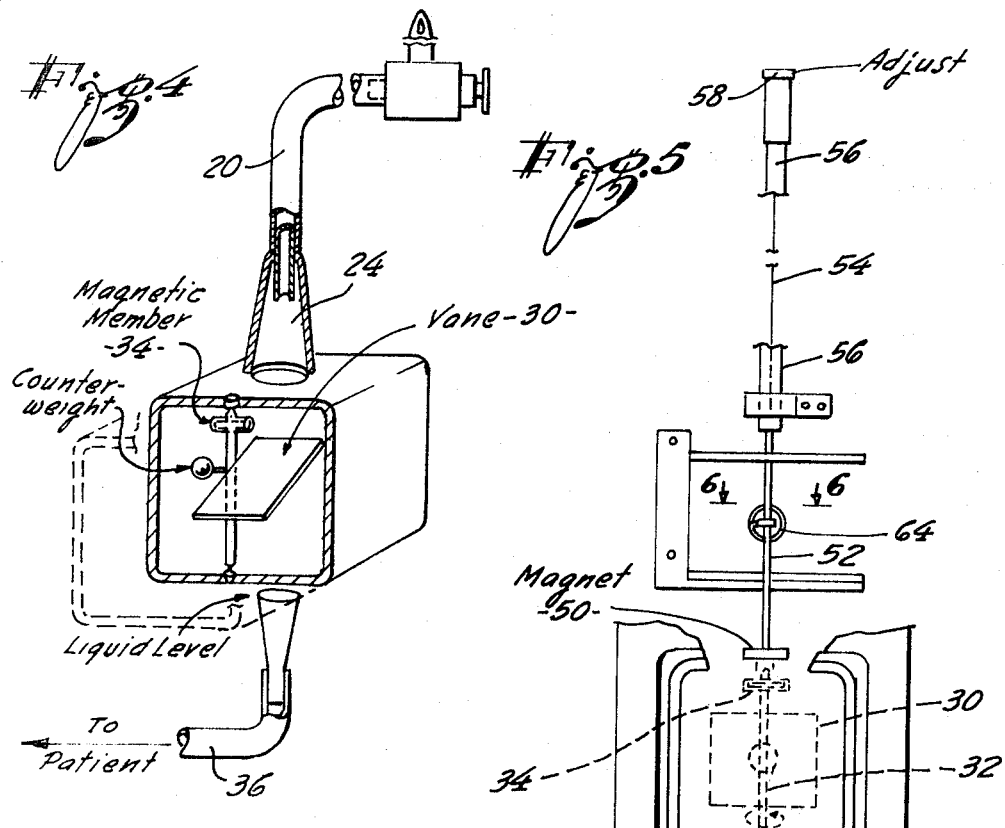
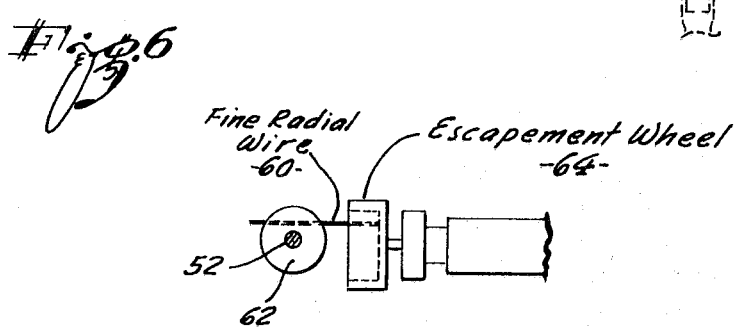

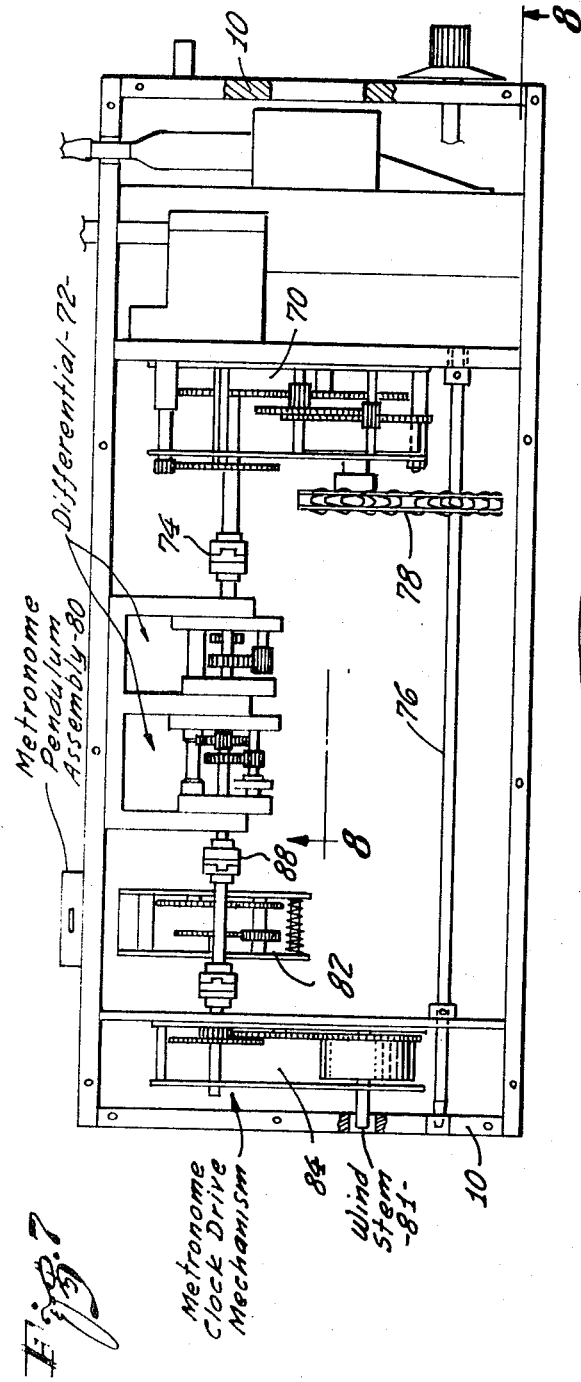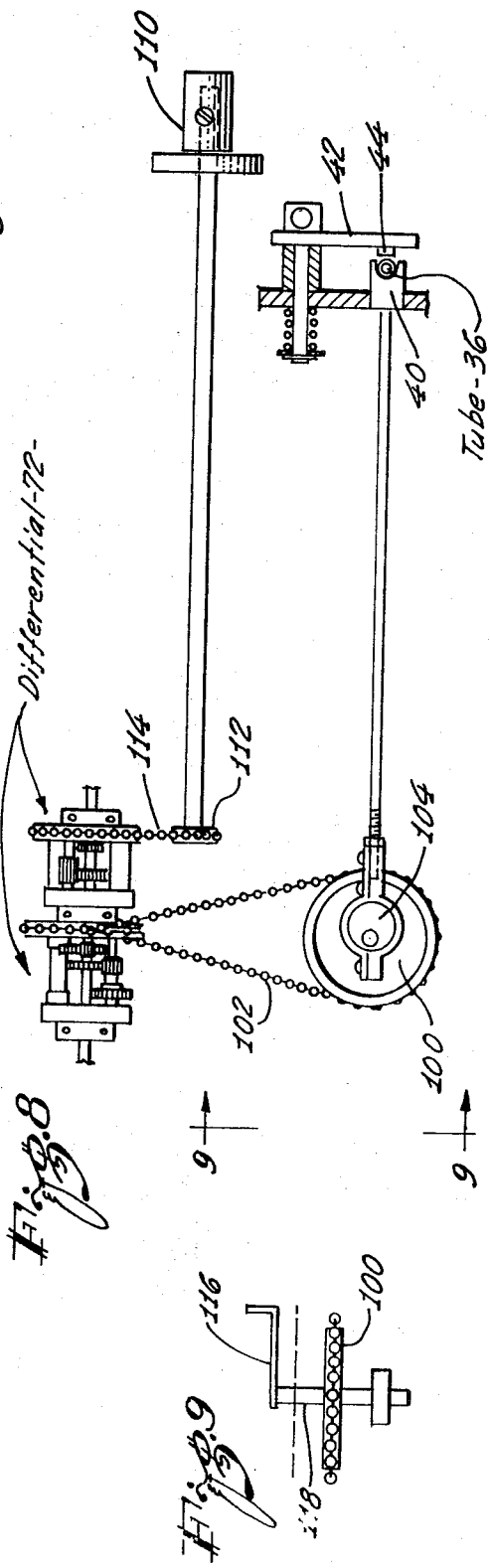

INTRAVENOUS FEEDING APPARATUS

BACKGROUND OF THE INVENTION

At the outset, it should be stated that although the principal utility at present for the apparatus of the invention appears to be for the control of intravenous feeding solutions, it will become apparent as the description proceeds that the apparatus has a widespread utility wherever it is desired to maintain a liquid drip rate at a pre-set standard. Therefore, although the invention will be described in conjunction with intravenous feeding, it will be appreciated that the apparatus has wider application.

Intravenous feeding is a technique by which nourishment is introduced directly into the vein of a patient. The usual prior art apparatus for intravenous feeding comprises a bottle of intravenous solution which is inverted over a transparent drip chamber. The prior art apparatus also includes a tube which extends from the bottom of the drip chamber to a needle which is inserted into the vein of the patient. The solution from the bottle drips down by the force of gravity through the chamber, and then through the tube and into the patient's vein at a controllable rate. The rate is controlled in the prior art apparatus by adjusting a pinch clamp on the tube, and the rate is determined in the prior art apparatus by visual inspection of the dripping.

Once the apparatus has been set up so that the intravenous solution is being fed into the patient, it is important that the rate be maintained constant, and this is achieved automatically by the apparatus of the invention. It is also important that some means be included in the apparatus for providing an indication and/or an actual alarm, should a rising venous pressure be indicated, which is indicative of collapsing veins or muscular infiltration; or should a dropping venous pressure be indicated, which is an indication that either the needle has been pulled out of the vein of the patient, or that the patient is in shock. The apparatus of the present invention is also capable of providing indications and/or alarms when the venous pressure rises or drops beyond safe thresholds.

Another important feature of the apparatus to be described is the fact that it is powered entirely by spring powered clockwork. This construction not only provides for long continuous and reliable service, but is also permits the apparatus of the invention to be used anywhere, even in the operating rooms, since there are no electrical connections, and there is no possibility of electrical sparks or arcing.

BRIEF DESCRIPTION OF THE DRAWINGS

FIG. 1 is a perspective representation of apparatus constructed in accordance with one embodiment of the invention;

FIG. 2 is a side elevation of the embodiment of FIG. 1 taken substantially along the line 2-2 of FIG. 1;

FIG. 3 is a fragmentary section taken along the line 3—3 of FIG. 2;

FIG. 4 is a perspective representation of one of the components of the apparatus, namely the drip receptacle and flexible tubular members through which the solution flows as a series of drips;

FIG. 5 is a section taken along the line 5—5 of FIG. 1;

FIG. 6 is a section taken along the line 6—6 of FIG. 5;

FIG. 7 is a section taken along the line 7—7 of FIG. 1;

FIG. 8 is a section taken along the line 8—8 of FIG. 7; and

FIG. 9 is a fragmentary and elevation taken along the line 9—9 of FIG. 8.

DETAILED DESCRIPTION OF THE ILLUSTRATED EMBODIMENT

The apparatus of the invention includes a housing 10 which may have a cubical configuration, as shown. A post 12 is mounted on the top of the housing 10, and a horizontal arm 14 is supported at the top of the post. Appropriate hook members 16 are provided at the end of the arm 14, and a bottle 18 is suspended, in an inverted position, by the hook 16.

The bottle 18 may contain an intravenous feeding solution, and it is held vertically by the post 12 and arm 14 to drain downwardly. In accordance with prior art practice, the solution in the bottle 18 empties through a drip chamber, and the assembly is equipped with bacterial filter air intake facilities.

A tubular member 20 is provided with a fitting 22 at one end, the fitting, as best shown in FIG. 4, being provided with a syringe portion 22a which is pierced through a resilient stopper in the bottom of the bottle 18 (FIG. 1), and through which the solution flows to the fitting 22 and through the tubular member 20 to a receptacle 23. A drip tube 24 couples the tubular member 20 to the receptacle 23. The receptacle 23 is provided with a transparent face, so that the passage of the solution through the receptacle may be observed.

An inclined vane 30 (coated with appropriate water repelling material such as paraffin wax) is mounted within the receptacle 23 in an offset manner on a vertical shaft 32. As each drop of solution passes through the receptacle 23, it impacts and rolls down the vane 30, and causes it and the shaft 32 to turn slightly about the vertical axis of the shaft. The receptacle 23 forms a drip chamber, with the vane 30 lying in the path of the falling drops. The vane converts the kinetic energy of the drops into mechanical energy, as it is deflected rotationally with its support shaft by each drop impacting upon it.

A magnetic cross piece member 34 is also mounted on the shaft 32, and it turns with the vane. Therefore, as each drop of the solution passes through the receptacle 23, it impacts the vane 30, and causes it to turn reciprocally, so as to turn the magnetic member 34 in the same reciprocal manner.

A flexible tubular member 36 is coupled to the lower side of the receptacle 23 and passes down through a slot in the end of the housing 10 to an appropriate hypodermic needle 37 (FIG. 1), which is inserted into the vein of the patient. The tube 36 passes through a pinch rod 40 at the lower end of the slot. The tube is held in place in the pinch rod by means of a spring loaded latch 42. The latch 42 may be pulled out from the plane of the end of the housing 10 and turned, to permit the tube 36 to be inserted in the pinch rod, and then the latch may be turned back to the position shown in FIG. 3, in which a protuberance 44 on the latch squeezes the tube 36 to control the passage of solution through the tube, as the pinch rod 40 moves in and out under the control of the mechanism.

As shown in FIG. 5, a permanent magnet 50 is supported on a vertical shaft 52 directly over the magnetic member 34, but outside the receptacle 23. The shaft 52 is supported by a torsion wire 54 which, in turn, is supported by a tubular member 56. The torsion of the wire 54 may be adjusted by a manual adjusting knob 58 at the top of the tubular member 56.

In the aforesaid manner, the vane 30 on the vertical shaft 32, and the magnetic cross piece 34 on the same shaft, and which is coupled to the external magnet 50 provide a coupling from a sterile environment within the receptacle 23 to the atmosphere with absolute isolation from bacterial, viral, chemical or other contaminations. As mentioned above, the permanent magnet 50 is rigidly mounted on the second shaft 52 which is axially aligned with the vane shaft 32, and which is suspended vertically by the torsion wire 54, thereby eliminating thrust bearings and friction. The torque may be pre-set to a desired value by the adjustment 58.

As shown in FIGS. 5 and 6, a fine radial wire 60 is mounted on a bushing 62 which is keyed to the support shaft 52. The wire 60 extends into a groove in the face of an escapement wheel 64. The groove in the face of the escapement wheel contains a pallet on one radius of the escapement wheel against which the wire 60 normally rests with a position set by the torsion wire 54. When a drop of solution impacts the vane 30, the vane is deflected, along with the associated magnetic cross piece 34, resulting in a corresponding slight rotational deflection of the magnet 50.

The rotation of the magnet 50 rotates the wire 60 beyond the end of the pallet, permitting the escapement wheel 64 to turn under the influence of an independent torque mechanism comprising a gear train and main spring contained in the drip clock mechanism (designated 70 in FIG. 7). The groove of the escapement wheel 64 restores the radial wire 60 to its previous position upon one full revolution of the escapement wheel so as to return the vane 30 and other elements of the drop detection system to their normal positions. In this way, the escapement wheel 64 is permitted to make one full revolution for each drop that passes through the receptacle 23 and which strikes the vane 30.

Since the vertical magnet support shaft 52, and the vertical vane support shaft 32 are in colinear relationship, the magnet 50 attracts the cross piece 34 by an amount closely offsetting the combined weights of the cross piece and vane assembly, and thereby eliminating the friction of the vane assembly; hence no lower thrust bearing is required. Any remaining need to restrain the shaft 32 from any but rotational freedom may be met by means of a simple needle bearing at the upper end of the shaft.

The fitting of FIG. 4, namely the drip tube 24 and receptacle 23, may be formed of an appropriate molded plastic material. The assembly can also be used independently of the apparatus described above, and in conjunction with a usual adjustable pinch cock. The assembly normally is used once, and is then discarded. Drip tubes of various diameters may be provided to produce different flows of corresponding ratios of drops per milliliter.

As shown in FIG. 7, the clock mechanism 70 provides a mechanical torque amplification means for the detected drip rate of the intravenous solution, and it provides a first input to a mechanical differential unit 72 through a first input shaft 74. The mechanism 70 includes a usual spring powered source, whose main spring may be wound by turning a crank at the left-hand end of the housing 10 in FIG. 7, to rotate a shaft 76, which is coupled to the main spring of the mechanism 70 through a chain drive 78.

The apparatus also includes a metronome pendulum assembly 80, which has an associated clock drive mechanism 82 powered, for example, by a clock mechanism 84. The clock mechanism 84 includes a main spring energizing source, which may be wound by turning a crank at the side wall of the housing 10, to turn a shaft 86. The metronome pendulum assembly, as shown in FIG. 1, includes a pendulum 80a which is equipped with a movable bob 80b. The bob 80b is slidably adjustable with respect to a calibrated scale, so that any desired drip rate in, for example, drops per minute, may be established.

The mechanisms 84 and 82 act as a mechanical amplifier for the metronome pendulum assembly, and they provide an input corresponding to the desired drip rate to the differential 72 through a shaft 88. Specifically, the mechanism 82 is a gear train which comprises a time based mechanical torque amplification system, and the mechanism provides the second input for the differential 72 through the input shaft 88. The mechanism 70, on the other hand, is a mechanical torque amplification system which derives the first input for the differential and which supplies that input through a shaft 74. The differential mechanism 72 continuously compares the two input shaft rates provided by the shafts 74 and 78, one input representing a desired drip rate, and the other input representing an actual drip rate.

Any differences in the drip rate cause the differential 72 to turn in a direction corresponding to the sense of the difference, and by an amount corresponding to the amount of the difference. As shown in FIG. 8, the differential is coupled to a wheel 100 through a chain drive 102, so that any turning of the differential is transmitted to the wheel 100. The wheel 100 is coupled to an eccentric cam 104, so that the angular changes of the wheel may be translated to corresponding longitudinal movements of a shaft 106. The pinch rod 40 is mounted on the end of the shaft 106, and it controls the cross section of the flexible tube 36, and, accordingly, the passage of solution through the tube, in accordance with the position of the differential. In this way, the flow is compensated, so that the differential mechanism 72 maintains the actual drip rate in correspondence with the pre-set drip rate established by the metronome.

A manual override control 110 is provided which is coupled through a wheel 112 and chain drive 114 to the differential mechanism 72, and which permits any desired setting of the pinch rod 40 preliminarily to be established.

As shown in FIG. 9, an indicator 116 is coupled to the wheel 100, so that the angular position of the differential may be indicated, as shown in FIG. 1. The indicator 116 frictionally engages its shaft 118, so that it can be set to a reference position for any particular position of the differential. Additional indicator arms 122 and 124 are provided adjacent the arm 116, as shown in FIG. 1, and these additional arms may be set to any desired angular inclination. Appropriate alarms can be established to be sounded whenever the indicator arm 116 turns to the position of the arm 112 or 124, indicating either an excessive rise or an excessive drop in the venous pressure, requiring appropriate acts.

The invention provides, therefore, an improved control apparatus which finds particular utility in the control of the passage of an intravenous feeding solution into the vein of a patient. The apparatus is advantageous in that it is easy to operate, and is capable of long, continuous and reliable operation. Also, the apparatus is relatively inexpensive in its construction. The illustrated embodiment does not require any electric circuitry, and thereby the unit, in addition to its capabilities for long operational and reliable life, can always also be used in environments where electrical arcing is not permissible.

As mentioned above, although the invention has been described in conjunction with intravenous feeding apparatus, it has utility wherever the passage of a liquid is to be controlled, and is to be maintained to a particular standard.

Therefore, while a particular embodiment of the invention has been shown and described, modifications may be made, and it is intended in the claims to cover all modifications which fall within the spirit and scope of the invention.

What is claimed is:

1. Intravenous feeding apparatus having means for supporting a source of intravenous solution, including: a receptacle through which a solution from the source passes in the form of a series of drops; a vane member mounted within said receptacle in an inclined offset position with respect to a vertical pivot axis to be contacted by the drops of the solution and to move angularly and in a reciprocal manner about said pivotal axis in response to each such drop; a first magnetic member mounted in said receptacle in mechanically coupled relationship with said vane member to move angularly therewith; a second magnetic member mounted externally of said receptacle and magnetically coupled to said first magnetic member to move in correspondence with said first magnetic member; a first mechanism mechanically coupled to said second magnetic member for establishing a first shaft rotation representative of the drip rate of the drops of said solution through said receptacle; a second mechanism for establishing a second shaft rotation representative of a pre-set drip rate; differential means coupled to said first mechanism and to said second mechanism for producing a control effect when the drip rate of the drops of said solution through the receptacle departs from the pre-set drip rate; and a control mechanism coupled to said differential means for compensating the drip rate of the drops through the receptacle so as to maintain the drip rate of the drops in correspondence with said pre-set drip rate.

2. The apparatus defined in claim 1, in which said vane and said first magnetic member are mounted on a first shaft extending along a vertical axis, and in which said second magnetic member is mounted on a second shaft extending along a vertical axis in co-linear relationship with the axis of said first shaft.

3. The apparatus defined in claim 2, and which includes support means including a torsion wire for supporting said second shaft along said vertical axis.

4. The apparatus defined in claim 1, and which includes a resilient tubular member coupled to said receptacle through which the solution passes, and in which said control mechanism includes a longitudinally movable rod, and a head for said rod engaging said tubular member to control the passage of the solutions through said tubular member.

5. The apparatus defined in claim 1, in which said first mechanism comprises a mechanical clockwork unit including an escapement wheel, and in which said second magnetic member includes a wire-like element engaging said escapement wheel, and coacting therewith to permit a stepped motion of said escapement wheel for each movement of said second magnetic member.

6. The apparatus defined in claim 1, in which said second mechanism includes a clockwork unit and a metronome pendulum assembly for establishing said pre-set drip rate.

7. The apparatus defined in claim 1, in which said differential means includes a mechanical gear transmission system mechanically coupled to said first mechanism and to said second mechanism, said differential means turning on a particular axis upon a difference between said first shaft rotation and said second shaft rotation, and in a direction corresponding to the sense of such difference and by an amount corresponding to the amount of such difference.

8. The apparatus defined in claim 7, and which includes a cam or crank mechanism coupled to said differential means for translating rotations of said differential means into corresponding longitudinal movements, and in which said control mechanism includes a shaft coupled to said cam or crank means and having a pinch rod mounted at one end thereof, and which includes a resilient tubular member coupled to said receptacle and through which the solution passes, said tubular member being engaged by said pinch rod to control the flow of the solution through said tubular member.

9. The apparatus defined in claim 7, and which includes an indicator coupled to said differential means for indicating the direction and amount of any rotations thereof about said particular axis.

10. The apparatus defined in claim 9, and which includes further indicators for designating when said first-named indicator means is displaced from a reference position in excess of a predetermined amount.

* * * * *